Sept. 20, 1932.   W. RICHTER   1,877,969
ELECTRIC ARC WELDING HEAD
Filed Feb. 17, 1930
Fig. 1.   Fig. 2.   Fig. 3.
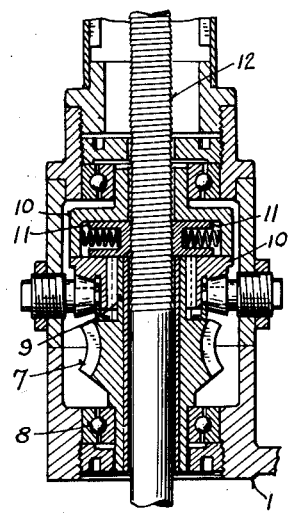
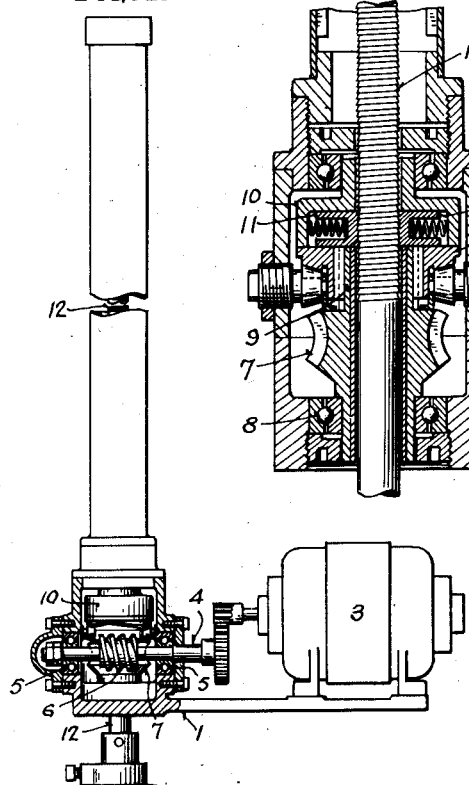
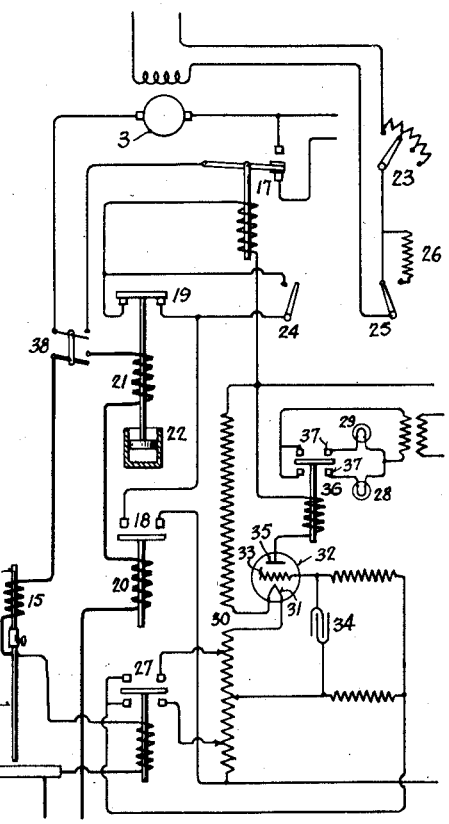
Fig. 4.   Fig. 5.
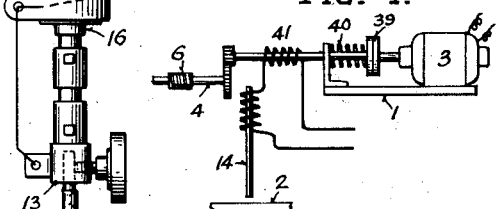
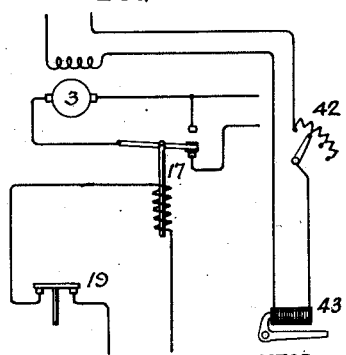
Fig. 6.
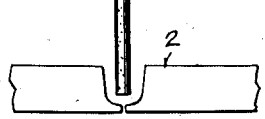
INVENTOR.
Walther Richter
BY
ATTORNEY.

Patented Sept. 20, 1932

1,877,969

UNITED STATES PATENT OFFICE

WALTHER RICHTER, OF MILWAUKEE, WISCONSIN, ASSIGNOR TO A. O. SMITH CORPORATION, OF MILWAUKEE, WISCONSIN, A CORPORATION OF NEW YORK

ELECTRIC ARC WELDING HEAD

Application filed February 17, 1930. Serial No. 429,059.

This invention relates to an electric arc welding head.

The object of the invention is to provide an arc welding head which relieves the operator of the fatiguing manual control of the electrode feed and which is instantly subject to the operator's control for correcting variations in the arc length.

Another object is to provide a head employing a direct motor drive for the electrode and in which novel means are provided for striking the arc between the electrode and the parts to be welded.

Another object of the invention is to provide an apparatus which will automatically indicate to the operator the characteristics of the welding arc.

Further objects will appear hereinafter in considering the preferred embodiment of the invention and various modifications thereof as illustrated in the accompanying drawing.

The views of the drawing are as follows:

Figure 1 is a side elevation of the welding head partly in section.

Fig. 2 is an enlarged vertical sectional view of the feeding mechanism of the head.

Fig. 3 is a diagram showing the electrical connections for the head.

Fig. 4 is a diagrammatic view of the modified form of head.

Fig. 5 is a diagram showing a further modification in the electrical control for the head.

Fig. 6 is a diagram showing another modification in the electric control of the head.

The welding head has a frame 1 which is supported in any suitable manner above the parts 2 being welded. A feed motor 3 is mounted on the frame 1 and drives a countershaft 4 extending horizontally across the head and journaled in bearings 5 in the frame 1.

A worm gear 6 is keyed to the drive shaft 4 and is arranged to drive a pinion 7 which rotates on a vertical axis and which is supported by a bearing 8 in the frame 1. The pinion 7 has an upward extension 9 to which a feed nut 10 is splined for rotation with the pinion and for vertical relative movement with respect thereto.

The feed nut 10 is provided with radially movable spring pressed thread engaging members 11 for engaging a threaded feed rod 12, the lower end of which is provided with a clamp 13 for holding a welding electrode 14.

The threads of the members 11 and rod 12 are preferably of buttress type so as to allow free upward movement of the rod through the nut and at the same time provide a control for the downward movement of the rod by the members 11.

The lower end of the feed rod 12 carries a solenoid 15 having a movable core 16 to which the clamp 13 is attached. The solenoid 15 is preferably connected in the welding circuit in series with the arc so that when the welding electrode 14 is fed downwardly into contact with the work 2 and the welding current established, the solenoid core 16 is moved upwardly, withdrawing the electrode from the work and striking the arc.

The electrode is fed forwardly both before and after the striking of the arc by the motor 3. However, where the weldrod is constantly fed downwardly by means of the motor during the period of striking the arc, it has been found that the arc becomes smothered due to the fact that an insufficient amount of time is allowed for the arc to heat the end of weldrod to a state of vaporization. It has therefore been found desirable to provide some means of checking the downward feed of the weldrod for a predetermined time immediately upon the striking of the arc.

A relay 17 having a double switch is operable to open the circuit of the motor armature and to short circuit said armature for a predetermined period of time during the striking of the welding arc. The coil of the relay 17 is connected in an independent circuit having a normally open switch 18 and a normally closed switch 19 therein.

The switch 18 is operated by a relay solenoid 20 arranged in the welding current circuit, while the switch 19 is operated by a relay solenoid 21 also connected in the welding circuit. The relay 20 is sensitive and rapid in operation while the relay 21 is a time relay controlled by the dashpot 22.

The operation of this part of the apparatus is as follows: as soon as the electrode 14 contacts with the work 2 and current starts flowing in the welding circuit, the relay 20 closes switch 18 thus closing the circuit of the coil of relay 17. Relay 17 then operates to open the armature circuit of the motor 3 and to short circuit the armature. After a predetermined time the dashpot 22 allows the relay 21 to open the switch 19 and thereby de-energize the relay 17. The armature circuit is then restored and the motor 2 resumes its feeding of the electrode 14. The higher the starting current of the arc, the more rapid will be the action of relay 21, so that the period of checking of the motor 3 will be in accordance with the rapidity of heating of the electrode 14 by the arc.

The short circuiting of the motor armature provides a dynamic brake which instantly stops the motor for a predetermined time upon the striking of the arc. The dashpot 22 may be adjusted or so constructed as to provide any required time lag before allowing the operation of relay 21, so that the time at which the motor will resume operation and the consequent time after the striking of the arc and before the weldrod is again fed downwardly, may be predetermined.

The speed at which the motor 3 feeds the weldrod downwardly is preferably controlled by a hand rheostat 23 arranged in the field circuit of the motor and also by a sensitive speed adjustment which the operator may use to make immediate correction for any unusual disturbances in the arc length during the welding operation.

This sensitive adjustment comprises preferably two push button switches 24 and 25. The switch 24 is connected to close the circuit of relay 17 and thereby short circuit the armature and brake or stop the motor. The switch 24 may be employed to insert a resistance in the armature circuit or remove a resistance in the field circuit or to otherwise function to reduce the speed of motor 3. The switch 25 inserts a high resistance 26 in the field circuit, thereby increasing the speed of the feed motor at the will of the operator. The operator's duty is to watch the arc and when it becomes too short, he momentarily presses switch 24 to brake and retard the feed of the electrode sufficient to correct the arc length. Should the arc become too long, he presses the switch 25 to increase the rate of feed of the electrode momentarily to correct the arc length.

In order to facilitate the correct observance of the arc length, it has been found preferable to provide means for indicating to the operator when the arc length has exceeded the desirable limits of its range.

This means may have various modifications but the one shown in Fig. 3, which has been found preferable, comprises principally, a volt meter relay 27 connected in shunt to the arc, a red and a green light 28 and 29, respectively, which are arranged in a convenient location for observance by the operator and which are connected to respond to opposite variations of the volt meter relay, and means for dampening the unimportant fluctuations of the volt meter relay. The dampening means includes a source of high voltage having a resistance 30 across the same in series with a filament 31 of a vacuum tube 32. The vacuum tube grid 33 is connected by means of a high resistance to the volt meter relay 27 and from there to different positions on the resistance 30. A condenser 34 is arranged in shunt to the grid 33 of the vacuum tube 32 and functions to dampen rapid fluctuations in potential which would otherwise be impressed upon the grid 33.

The more important slower fluctuations of the volt meter relay effect the potential of the grid 33. The plate 35 of the vacuum tube is connected to the opposite line of the high potential circuit from that of the volt meter relay connection and operates an auxiliary relay 36 having double contact switches 37 which operate the red and green lights 28 and 29. When the arc becomes too short, its voltage decreases and the volt meter relay, vacuum tube and auxiliary relay function to light the red light 28 which indicates to the operator that the arc has become too short and that he should press the switch 24 to retard the electrode feed. When the arc becomes too long, the green light 29 indicates to the operator that he should press the switch 25 to increase the rate of electrode feed.

The operation of the welding head is as follows.

When the work 2 is properly positioned for welding and the electrode 14 has been inserted in the clamp 13, the operator closes the double switch 38 which closes the welding circuit and also the circuit of the feed motor 3. The feed motor drives the electrode downwardly into contact with the work whereupon current flows in the welding circuit, causing the solenoid 15 to withdraw the electrode from the work and strike the arc, and simultaneously causing a stopping of the feed motor for a predetermined time due to the short circuiting of its armature through the action of relay 17.

Thereafter, should the arc become too short, the red light 28 flashes and indicates to the operator that he should press the switch 24 to correct the arc length and should the arc become too long, the flashing of the green light 29 indicates to the operator that he should press the switch 25.

In Fig. 4, a modification of the arc striking control is shown. Instead of stopping the motor, a disk clutch 39 is provided between the motor 3 and the worm gear 6. The clutch is normally closed by a spring 40 and a solenoid 41 is connected in the welding circuit and functions to open the switch and stop the weldrod feed at the moment of striking the arc, similar to the function of the relay 17 in short circuiting the motor armature.

In Fig. 5, a modification of the motor speed adjustment is shown. Instead of employing two control switches, the modification employs two hand rheostats 42 and 43.

The rheostat 42 provides for a coarse or general setting of the motor speed to accommodate general welding conditions.

The rheostat 43 provides a fine sensitive adjustment of the motor speed within the limits required by operating conditions and enables the operator to re-adjust the motor speed instantly to meet varying conditions.

Fig. 6 shows a modification of the means for stopping the electrode at the instant of striking the arc. In this modified form of the invention, the armature circuit of the motor 3 has a secondary coil 44 of a transformer connected therein. The primary coil 45 of the transformer is connected in the welding circuit.

When the weldrod contacts with the work and establishes a flow of high amperage in the welding circuit, a counter-electro-motive force is set up in the armature circuit of the motor by the transformer. The counter-electro-motive force tends to reverse the direction of rotation of the motor armature.

A resistance 46 arranged in the motor armature circuit tends to prolong the counter-electro-motive force to prevent the inrush of current from the direct current source which ordinarily operates the motor. After the arc has been struck, current flow in the welding circuit is reduced and maintained substantially constant so that there is no further transformer action tending to oppose the flow of current through the motor armature in a direction to cause the downward feeding of the electrode.

Various modifications of the invention in its several phases may be employed within the scope of the accompanying claims.

I claim:

1. An arc welding head comprising, in combination, means for feeding an electrode, an electric motor for driving the feeding means to feed the welding electrode toward the work to be welded, means for withdrawing the electrode from contact with the work to establish a welding arc therebetween, means operating at the instant of striking the arc to stop the feed of the electrode toward the work for a predetermined interval of time, and means for manually checking the rate of feed of the electrode toward the work to maintain the required arc length.

2. An arc welding head comprising a motor driven means arranged to feed a welding electrode toward the work to be welded, means to withdraw the electrode from the work to establish an arc therebetween, means operative at the instant of establishing the arc to short circuit said motor armature and thereby stop the forward feed of the electrode for a predetermined period of time, and manually operable means for checking the speed of said motor to temporarily reduce the rate of electrode feed and thereby maintain the required arc length.

3. In an arc welding head for feeding electrodes, in combination, means for feeding an electrode, a motor for driving the feeding means, means cooperative with the feeding means for striking an arc, said motor being disposed to feed the electrode at a constant speed after the arc is struck, means for braking the motor, and means disposed for manual operation for effecting the application of the braking means to check the speed of the motor and electrode feeding means when the arc becomes too short.

4. In an arc welding head for feeding electrodes, in combination, means for feeding an electrode, a motor having a separately excited field winding for driving the feeding means, means cooperative with the feeding means for striking an arc, said motor being disposed to feed the electrode at a constant speed when the arc is struck, means for braking the motor, means disposed for manual operation for effecting the application of the braking means to check the speed of the motor and electrode feeding means when the arc becomes too short, and means disposed for manual operation for shunting the field of the motor to accelerate it when the arc becomes too long.

5. In a manually controlled arc welding head for feeding electrodes, in combination, means for feeding the electrode, a motor for driving the feeding means, a welding circuit for supplying current to the electrode, means for initiating the operation of the motor to feed the electrode and establish the welding circuit, means for actuating the electrode to strike an arc when the welding circuit is established through the feeding of the electrode, means responsive to the establishment of the welding circuit for checking the operation of said motor and feeding means, and a time-element relay disposed to be actuated in response to a flow of current in the welding circuit for interrupting the operation of the means for checking the motor, thereby to permit the operation of the motor to effect a feeding of the electrode at a constant speed.

6. In a manually controlled arc welding head for feeding electrodes, in combination, means for feeding the electrode, a motor for driving the feeding means, a welding circuit for supplying current to the electrode, means for initiating the operation of the motor to feed the electrode and establish the welding circuit, means for actuating the electrode to strike an arc when the welding circuit is established through the feeding of the electrode, means responsive to the establishment of the welding circuit for checking the operation of said motor and feeding means, a time-element relay disposed to be actuated in response to a flow of current in the welding circuit for interrupting the operation of the means for checking the motor, thereby to permit the operation of the feeding means by said motor, and means disposed for manual operation for checking the feeding of the electrode when the arc becomes too short and for accelerating the feeding means when the arc becomes too long.

7. In a manually controlled arc welding head for feeding electrodes, in combination, means for feeding an electrode, a constant speed motor for driving the feeding means, a welding circuit for supplying current to the electrode for performing welding operations, means for initiating the operation of the motor to feed the electrode and close the welding circuit, means responsive to the establishment of the welding circuit for checking the operation of the motor and electrode feeding means, and a time-delay relay for interrupting the operation of said checking means after a predetermined interval of time to permit a continuation of the operation of the motor and feeding means.

8. In a manually operable arc welding head for feeding electrodes, in combination, means for feeding an electrode, a motor for driving the feeding means, means cooperative with the feeding means for striking an arc, means responsive to change in the characteristics of the arc for indicating the condition of the arc, and means disposed for manual operation for checking the feeding means when the arc is too short and for accelerating the feeding means when the arc is too long as shown by the indicating means, whereby the welding head may be controlled to maintain an efficient arc for performing welding operations.

9. In an arc welding head for feeding electrodes, in combination, means for feeding an electrode, a motor for driving the feeding means, means cooperative with the feeding means for striking an arc, a relay connected across the arc to respond to changes in the voltage, a signaling system, and means interposed between the signaling system and the relay to cause the signaling system to respond to changes in voltage, said interposed means being disposed to respond only to the more sustained changes in the arc voltage to indicate the general condition of the arc.

10. In an arc welding head for feeding electrodes, in combination, means for feeding an electrode at a constant speed, manually operable means for checking the feeding of the electrode to increase the length of the arc and for accelerating the feeding of the electrode to decrease the length of the arc, means connected across the arc to respond to changes in arc voltage, and means for indicating changes in the arc characteristics disposed to be controlled by the means connected across the arc to respond to changes in voltage.

11. In an arc welding head for feeding electrodes, in combination, means for feeding an electrode at a constant speed, manually operable means for checking the feeding of the electrode to increase the length of the arc and for accelerating the feeding of the electrode to decrease the length of the arc, means connected across the arc to respond to changes in arc voltage, means for indicating changes in the arc characteristics disposed to be controlled by the means connected across the arc to respond to changes in voltage, and means disposed between the signaling means and the voltage responsive means to restrict the functioning of the signaling means to sustained voltage variations in the arc.

12. In an arc welding head for feeding electrodes, in combination, means for feeding an electrode, a motor having a separately excited field winding for driving the feeding means to feed the electrode at a constant speed, means cooperative with the feeding means for striking an arc, means for braking the motor to check the speed at which the electrode is fed, means responsive to the striking of an arc for applying the braking means to check the speed of the motor and electrode feeding means the instant the arc is struck, means responsive to the flow of welding current for interrupting the operation of the braking means, means disposed for manual operation for effecting the application of the braking means to check the speed of the motor and electrode feeding means when the arc becomes too short, and means disposed for manual operation for shunting the field winding of the motor to accelerate it and the electrode feeding means when the arc becomes too long.

13. In an arc welding head for feeding electrodes, in combination, means for feeding an electrode, a motor having a separately excited field winding for driving the feeding means to feed the electrode at a constant speed, means cooperative with the feeding means for striking an arc, a dynamic braking circuit for the motor, means responsive to the striking of an arc for connecting the dynamic braking circuit to check the speed of the motor the instant the arc is struck, a time-delay relay responsive to the arc current for interrupting the dynamic braking circuit a predetermined time after the arc is struck, and a plurality of push button switches disposed for manual operation, one of said switches being disposed to effect the establishment of the dynamic braking circuit to check the speed of the motor and the electrode feeding means when the arc becomes too short and the other for shunting the separately excited field winding of the motor to accelerate it and the electrode feeding means when the arc becomes too long.

14. In an arc welding head for feeding electrodes, in combination, means for feeding an electrode, a motor having a separately excited field winding for driving the feeding means to feed the electrode at a constant speed, means cooperative with the feeding means for striking an arc, a dynamic braking circuit for the motor, means responsive to the striking of an arc for establishing the dynamic braking circuit to check the speed of the motor the instant the arc is struck, a time-delay relay responsive to the arc current for interrupting the dynamic braking circuit a short time after the arc is struck, means responsive to changes in the characteristics of the arc for indicating the conditions of the arc, and a plurality of push button switches disposed for manual operation, one of said switches being disposed to effect the establishment of the dynamic braking circuit to check the speed of the motor and the electrode feeding means when the arc becomes too short and the other for shunting the separately excited field winding of the motor to accelerate it and the electrode feeding means when the arc becomes too long.

15. In an arc welding head for feeding electrodes to establish and maintain a welding circuit including an arc, in combination, means for feeding an electrode at a constant speed, means cooperative with the feeding means for striking an arc, an automatic means for checking the speed of the feeding means immediately when the welding circuit is established, said checking means thereby cooperating to maintain the arc.

16. In an arc welding head for feeding electrodes to establish and maintain an arc, in combination, means for feeding an electrode at a constant speed, means cooperative with the feeding means for striking an arc, means for checking the speed of the constant speed feeding means, a push button control circuit for effecting the operation of the speed checking means when the arc becomes too short, means for accelerating the feeding means, and a push button control circuit for effecting the operation of the accelerating means when the arc becomes too long.

17. In an arc welding head for feeding electrodes to establish and maintain a welding circuit including an arc, in combination, means for feeding an electrode at a constant speed, means cooperative with the feeding means for striking an arc, means for checking the speed of the feeding means, means responsive to the establishment of a welding circuit by the striking of an arc for immediately causing the operation of the checking means, and a plurality of push button control circuits, one for effecting the operation of the speed checking means to delay the feeding of the electrode when the arc becomes too short and the other for accelerating the feeding of the electrode when the arc becomes too long.

Subscribed this 12th day of February, 1930.

WALTHER RICHTER.